United States Patent
Kamiya et al.

(10) Patent No.: US 6,575,701 B2
(45) Date of Patent: Jun. 10, 2003

(54) BLOWER FOR VEHICLE

(75) Inventors: Tomohiro Kamiya, Takahama (JP); Kazushi Shikata, Kariya (JP); Masafumi Kawashima, Kariya (JP); Satomi Suzuki, Nagoya (JP); Manabu Miyata, Obu (JP); Kouji Matsunaga, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/128,108

(22) Filed: Apr. 23, 2002

(65) Prior Publication Data

US 2002/0154993 A1 Oct. 24, 2002

(30) Foreign Application Priority Data

Apr. 24, 2001 (JP) ........................................ 2001-126518

(51) Int. Cl.[7] .............................................. F04D 17/08
(52) U.S. Cl. ........................................ 415/206; 454/139
(58) Field of Search ................................ 454/121, 139, 454/156; 415/204, 205, 206

(56) References Cited

U.S. PATENT DOCUMENTS 5,511,939 A * 4/1996 Tokunaga et al. ........... 415/206

FOREIGN PATENT DOCUMENTS

JP  B2-2690005  8/1997

* cited by examiner

Primary Examiner—Harold Joyce
(74) Attorney, Agent, or Firm—Harness, Dickey & Pierce, P.L.C.

(57) ABSTRACT

The same size casing is used for interior air blowers of a combination air conditioning and heater interior unit disposed in left- and right-hand drive vehicles, respectively. A casing width is made nearly constant from a start-of-winding position to an end-of-winding position. An approximately central fan datum line which passes through a fan is offset to a suction port side with respect to a casing datum line which passes through an approximately central part of a portion of the casing parallel to a blower rotational axis. A flange portion of a motor holder is located at a position offset to one side (suction port side) along the rotational axis rather than an opposite side along the same direction in the casing. By replacement of impression cores it is possible to manufacture the casings for right- and left-hand drive vehicles, respectively.

13 Claims, 14 Drawing Sheets

BLOWER FOR VEHICLE

CROSS REFERENCE TO RELATED APPLICATION

This application is based upon and claims the benefit of priority of Japanese Patent Application No. 2001-126518, filed on Apr. 24, 2001, the contents of which are incorporated herein by reference.

BACKGROUND OF THE INVENTION

1. Field of the Invention

The present invention relates to a blower for blowing air within a vehicle passenger compartment, and more specifically, it relates to a blower for an air conditioner and heater arrangement.

2. Description of Related Art

A blower adopted in an air conditioner for a vehicle is required to be small in size and have a large air blowing capacity. Because of this, there usually is a centrifugal fan in which gas passes radially through an impeller (see JIS B 0132 No. 1004).

In a centrifugal fan (hereinafter referred to simply as "fan"), a fan is received within such a scroll casing (simply "casing" hereinafter) which is designed to gradually increase in cross-sectional area of passage from a start-of-winding position toward an end-of-winding position. However, since air (a main flow of air) blown from the fan is offset to a side opposite to a suction port, there is proposed a casing wherein the side (electric motor side) opposite to the suction port is enlarged in a spiral fashion so as to project to a greater extent gradually from a start-of-winding position toward an end-of-winding position.

In the casing thus proposed, however, since the shape of the suction port side and that of the electric motor side are markedly different from each other, it is difficult to use a blower (casing) in common for both blowers (casings) to be disposed on the left- and right-hand sides, respectively, of a vehicle.

On the other hand, if the size (cross section) of a casing portion parallel to an axis of rotation is made constant and the projecting portion on the side opposite to the suction port is omitted, it is necessary to make the diameter of the casing large (to an extent (angle) that the air passage is enlarged in a logarithmic spiral). This must be done in order to ensure a required cross-sectional area of air passage.

SUMMARY OF THE INVENTION

The present invention has been accomplished in view of the above-mentioned drawbacks and it is an object of the present invention to use a blower casing that is common for both blowers (casings) so that they can be disposed on the left- and right-hand sides, respectively, of a vehicle. This is accomplished while preventing the enlargement of the blower casing size.

For achieving the above-mentioned object, in a first aspect of the present invention, there is provided a blower for a vehicle, comprising a centrifugal fan which draws in air in a rotational axis direction and which blows air radially outwards, a scroll casing which houses the centrifugal fan therein and which constitutes a passage for the air to be blown from the centrifugal fan, and a drive means for rotating the centrifugal fan. The size of the scroll casing, parallel to the rotational axis direction of the scroll casing, is nearly constant from a start-of-winding position to an end-of-winding position in the scroll casing. A suction port is formed in a portion of the scroll casing corresponding to one end side along the rotational axis, while in a portion of the scroll casing corresponding to an opposite end side along the rotational axis the drive means is fixed to the scroll casing through a mounting member. A fan datum line which approximately passes through a middle part of the centrifugal fan in the rotational axis direction is offset to the suction port side with respect to a casing datum line. The casing datum line passes through an approximately middle part of the portion of the scroll casing which is parallel to the rotational axis. A flange portion of the mounting member faces the centrifugal fan and lies in a position offset to one end side of the scroll casing along the rotational axis rather than the opposite end side along the same direction.

According to this constitution, it is possible to prevent the shape of the suction port side of the scroll casing, and that of the drive means side, from becoming greatly different from each other, thus making it possible to use the scroll casing as a common casing for both blowers (scroll casings) and be disposed on the left- and right-hand sides, respectively, of the vehicle.

Further, since the fan datum line is offset to the suction port side with respect to the casing datum line and the flange portion lies in a position offset to one end of the scroll casing along the rotational axis rather than the opposite end along the same direction, there is formed a (projecting) space which is offset to the opposite end along the rotational axis direction with respect to the flange portion. Therefore, even if the size of the portion of the scroll casing parallel to the rotational axis is made nearly constant from the start-of-winding position to the end-of-winding position of the scroll casing, it is possible to ensure a sufficient cross-sectional area of air passage.

Thus, according to the above depiction, since it is not necessary to set large the diameter of the scroll casing for ensuring a sufficient cross-sectional area of air passage, it is possible to use the scroll casing for both blowers (scroll casings) to be disposed on the left- and right-sides, respectively, of the vehicle while preventing an increase in size of the scroll casing.

In a second aspect of the present invention it is preferable that the size (W) of the portion of the scroll casing parallel to the rotational axis be larger than 1.1 times and smaller than 1.6 times the size (h) of the portion of the centrifugal fan parallel to the rotational axis direction (CL). In a third aspect of the present invention, the distance (nose gap, NG) between a nose portion (No) of the scroll casing and the centrifugal fan should be smaller than 0.07 times the diameter (D) of the centrifugal fan.

If the size (W) of the portion of the scroll casing parallel to the rotational axis (CL) is enlarged, the cross-sectional area of air passage in the nose portion (No) becomes large and the flow of air becomes unstable, resulting in deterioration of the pressure and noise levels in the blower.

By setting the distance (NG) between the nose portion (No) and the centrifugal fan at the value shown in the above third aspect, it is possible to improve the blower performance and reduce the size of the scroll casing while preventing a deterioration in noise level of the blower.

In a fourth aspect of the present invention there is provided an air conditioner for a vehicle for conditioning air to be blown into a vehicle compartment, comprising an air conditioner casing, within which there flows air to be blown into the vehicle compartment, and a blower for making air flow within the air conditioner casing. The blower has a centrifugal fan which draws in air along the rotational axis and which blows air radially outwards. The blower also has a scroll casing which houses the centrifugal fan and which constitutes a passage for the air to be blown from the centrifugal fan. Additionally, there is a drive means for rotating the centrifugal fan, wherein the size (W) of a portion of the scroll casing parallel to the rotational axis (CL) is nearly constant from a start-of-winding position to an end-of-winding position in the scroll casing. A suction port is formed in a portion of the scroll casing corresponding to one end side along the rotational axis direction (CL), while in a portion of the scroll casing corresponding to an opposite end side along the rotational axis (CL) the drive means is fixed to the scroll casing through a mounting member. A fan datum line (CLf) which passes through an approximately middle part of the centrifugal fan along the rotational axis (CL) is offset to the suction port side with respect to a casing datum line (CLc) which passes through an approximately middle part of the portion of the scroll casing parallel to the rotational axis (CL). The mounting member has a flange portion which faces the centrifugal fan and lies in a position offset to one end side of the scroll casing along the rotational axis (CL) rather than the opposite end. Further, the air conditioner casing comprises common components (air inlet mode selector, heat exchanger, blow mode selector) for use common to various vehicle models and dedicated components (connection duct and scroll casing) for each individual vehicle model. The common and dedicated components being fabricated as separate components and thereafter being assembled together.

This construction representation permits easy fabrication of both air conditioner casings for right- and left-hand drive vehicles.

In a fifth aspect of the present invention there is provided a blower for a vehicle, comprising a centrifugal fan which draws in air along a rotational axis and which blows air radially outwards, a scroll casing which houses the centrifugal fan and which has a passage for air to be blown from the centrifugal fan, and a drive means for rotating the centrifugal fan. The size (W) of a portion of the scroll casing parallel to the rotational axis (CL) is nearly constant from a start-of-winding position to an end-of-winding position in the scroll casing, while first and second openings are formed, respectively, in a portion of the scroll casing corresponding to one end side of the centrifugal fan along the rotational axis (CL) and in a portion of the scroll casing corresponding to an opposite end side of the centrifugal fan along the same axis. Both openings being the same in shape, a bell mouth portion which constitutes an outer edge portion of a suction port is installed in the first opening, and the drive means is installed in the second opening through a mounting member.

According to this constitution, it is not necessary to differentiate the openings in shape with use of impression cores for manufacture which will be described later. Consequently, while attaining the reduction in mold cost for the manufacture of the scroll casing, it is possible to use the scroll casing for either blower (scroll casing) to be disposed on the left- and right-hand sides, respectively, of the vehicle.

In a sixth aspect of the present invention there is provided a method of making a scroll casing which houses a centrifugal fan and which has a first opening and a second opening formed in positions corresponding to one end side and an opposite end side, respectively, along a rotational axis of the centrifugal fan. The method entails a first impression core which forms a portion corresponding to the first opening and a second impression core which forms a portion corresponding to the second opening. The impression cores are removably mounted on a mold body and molten material is charged into the mold body in a mounted state of both impression cores to the mold body.

According to this constitution, by mere replacement of impression core it is possible to easily manufacture scroll casings for right- and left-hand drive vehicles. Consequently, it becomes possible for a scroll casing to be used for both blowers (scroll casings) to be disposed on the left- and right-hand sides, respectively, of a vehicle.

The above parenthesized numerals represent, as examples, correlations with descriptions in embodiments of the present invention. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiments is merely exemplary in nature and is in no way intended to limit the invention, its application, or uses.

First Embodiment

Figure 1:
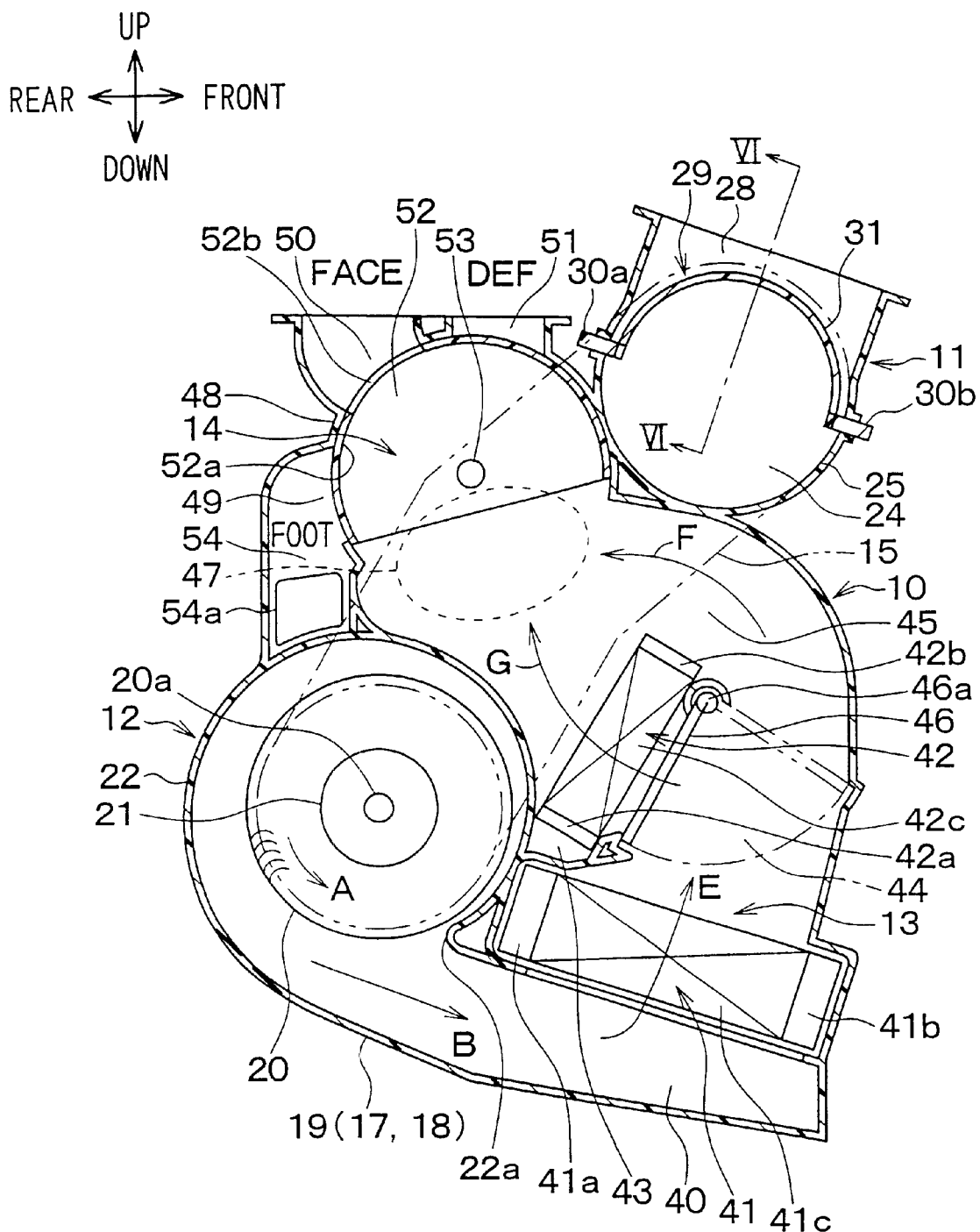
FIG. 1 is a schematic cross-sectional view of an interior unit in a vehicular air conditioner according to a first embodiment of the present invention.
Figure 2:
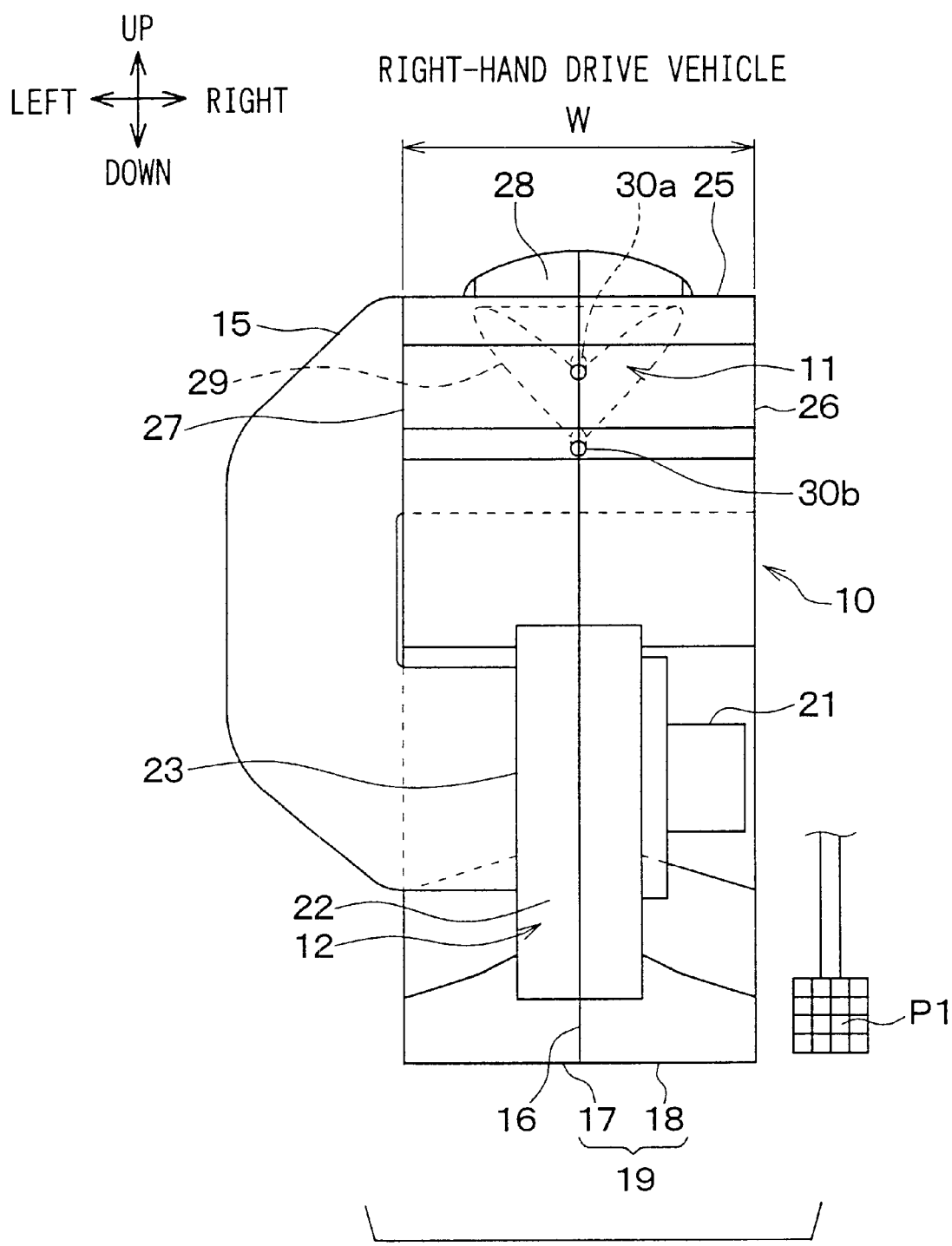
FIG. 2 is a front view of the interior unit of FIG. 1 as seen from the interior of a vehicle compartment of a right-hand drive vehicle.
Figure 3:
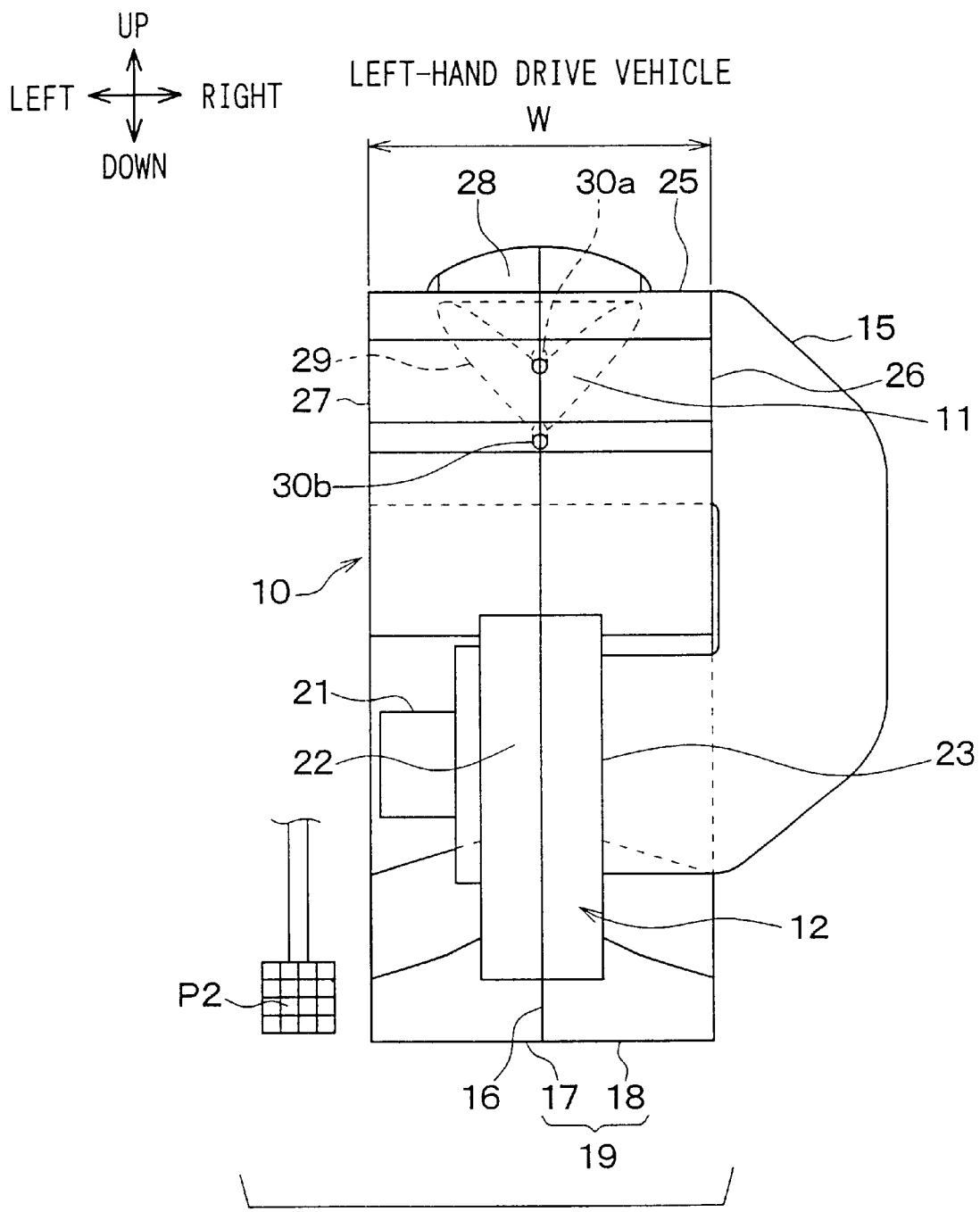
FIG. 3 is a front view of the interior unit of FIG. 1 as seen from the interior of a vehicle compartment of a left-hand drive vehicle.

A vehicular blower according to this embodiment is applied to a vehicular air conditioner. FIG. 1 is a schematic cross-sectional view of an interior unit 10 in a vehicular air conditioner associated with the first embodiment, and FIGS. 2 and 3 are front views of the interior unit 10 as seen from a rear side of a vehicle. FIG. 2 shows an interior unit 10 for a right-hand drive vehicle and FIG. 3 shows an interior unit 10 for a left-hand drive vehicle. FIG. 2 shows a foot pedal P1 and FIG. 3 shows a foot pedal P2 to provide locational reference for the interior unit 10.

The interior unit 10 is disposed inside an instrument panel (not shown) located at a front portion within the vehicle compartment (passenger compartment) and at a nearly central position with respect to the vehicle's width (transverse position). In this case, the interior unit 10 is mounted with respect to vertical, longitudinal and transverse directions of the vehicle as indicated with arrows in FIGS. 1 to 3.

The interior unit 10 according to this embodiment is roughly made of an air inlet mode selector section 11, a blower section (vehicular blower) 12, a heat exchanger section 13, a blow-mode selector section 14, and a connection duct 15 for connection between an air outlet in the air inlet mode selector section 11 and a suction side of the blower section 12. The details of components 11 to 15 will be described later.

As shown in FIGS. 2 and 3, the interior unit 10 is mounted on the vehicle in such a manner that a dividable interface (a joined interface of dividable casing halves) 16 of a casing 19 (interior unit 10) is located at a nearly central position with respect to a vehicle's width. The casing 19 is assembled by clamping dividable casing halves 17 and 18 with clamp means such as bolts or clips, the dividable casing halves 17 and 18 being dividable from each other in the right and left direction with respect to the figures.

The dividable casing halves 17 and 18 are formed by molding a resin material (such as polypropylene) having a certain degree of elasticity and having a high mechanical strength. The casing (dividable casing halves 17 and 18) is composed of left and right symmetrical halves with respect to the dividable interface 16. This feature permits the whole of the interior unit 10 to be used for both right- and left-hand drive vehicles.

The following description is now provided about the air inlet mode selector section 11 and the blower section 12 (see FIG. 1). The air inlet mode selector section 11 is disposed above the heat exchanger section 13 and toward a front position of the vehicle, while the blower section 12 is disposed below the interior unit 10 and toward a rear position of the vehicle (the rear position is a position close to an occupant in the passenger compartment).

Figure 4:
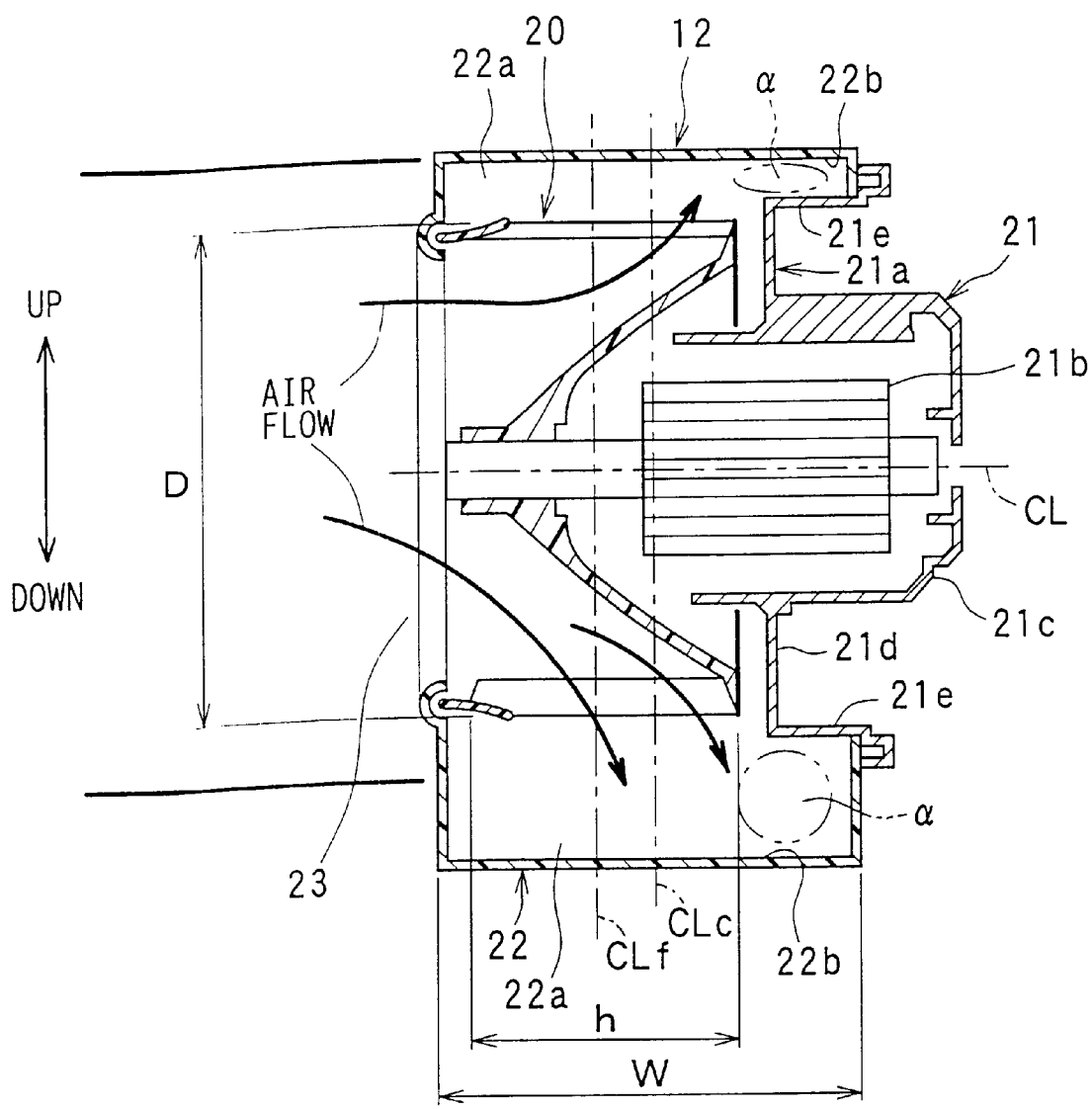
FIG. 4 is a cross-sectional view of a blower according to the first embodiment of the present invention.

As shown in FIG. 4, the blower section 12 comprises a centrifugal fan (hereinafter referred to simply as "fan"), an electric motor (drive means) 21 with a shaft 20a for rotating the fan 20, and a scroll casing ("fan casing" hereinafter) 22 made of resin (polypropylene in this embodiment), the fan casing 22 housing the fan 20 therein and defining a passage 22a for air to be blown from the fan 20.

The dimension W of a portion of the fan casing 22 parallel to a rotational axis CL is nearly constant from a start-of-winding position to an end-of-winding position of the fan casing. Further, a suction port 23 is formed in a portion corresponding to one end along the rotational axis CL (one end in the horizontal direction in this embodiment) in the fan casing 22. In a portion corresponding to an opposite end in the rotational axis direction CL (an opposite end side in the horizontal direction in this embodiment) the electric motor 21 (simply "motor" hereinafter) is fixed to the fan casing 22 through a motor holder (mounting member) 21a.

The motor holder 21a comprises a generally disc-shaped flange portion 21d and a generally cylindrical portion 21e which is opposed to an inner wall surface 22b on an outer periphery side of the fan casing 22. The flange portion 21d projects radially outward around the entire circumference of an outer periphery of a generally cylindrical motor housing 21c and facing the fan 20. The motor housing 21c houses a rotor (armature) 21b of the motor 21. The cylindrical portion 21e is fitted in the fan casing 22.

The motor housing 21c is formed as a double cylinder comprising a yoke portion formed of a magnetic material and facing the rotor 21b. The motor housing 21c also is formed with a holder portion made of resin, the holder portion covering the yoke portion and being integral with the motor holder 21a.

A fan datum line (CLf) which passes through an approximately middle part of the centrifugal fan 20 parallel to the rotational axis CL is offset to the suction port 23 side (left-hand side in FIG. 4) with respect to a casing datum line CLc. The casing datum line CLc passes through an approximately middle part of the portion of the fan casing 22 parallel to the rotational axis CL, and the flange portion 21d of the motor holder 21a lies in a position offset to one side (suction port 23 side) along the rotational axis CL rather than the opposite side (right-hand end in FIG. 4) in the same fashion as the fan casing 22, with respect to the motor housing 21c.

Consequently, a space (gap) α formed between the cylindrical portion 21e and the inner wall surface 22b of the outer periphery-side is offset (projected) to the opposite end (side) (right-hand side in FIG. 4) along the rotational axis CL with respect to the flange portion 21d.

Figure 5:
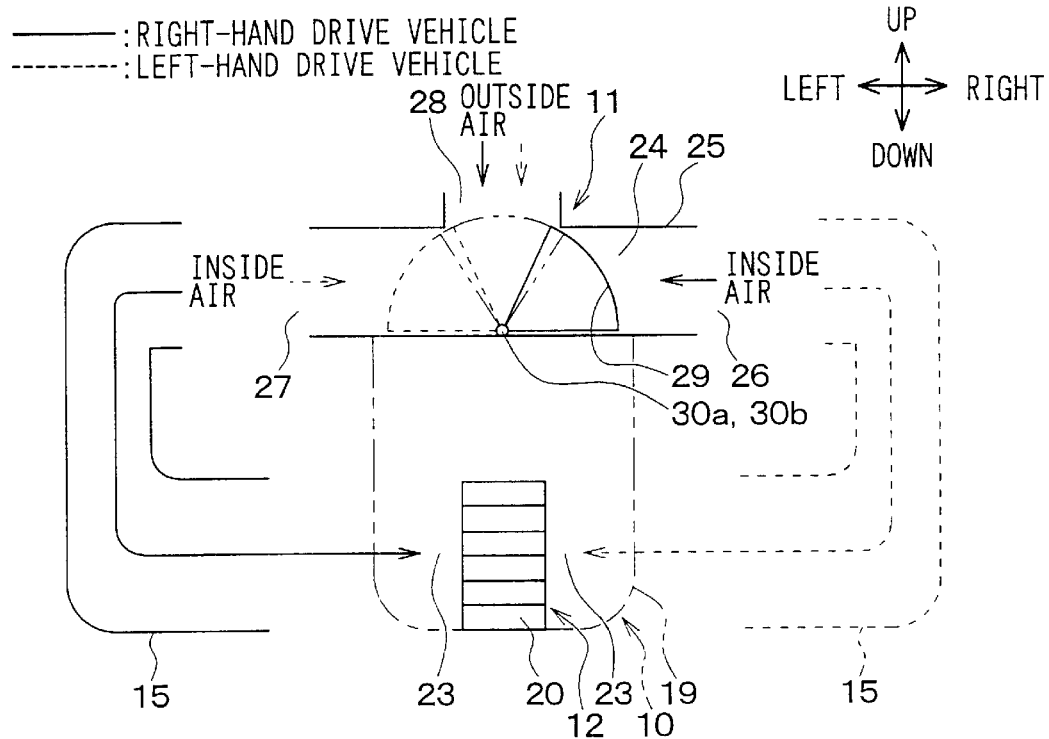
FIG. 5 illustrates a connection between an air inlet mode selector section and a blower section in the first embodiment.

FIG. 5 illustrates an example of connection between the air inlet mode selector section 11 and the blower section 12. The air inlet mode selector section 11 is formed by a casing 25 which defines an air passage 24 extending across the vehicle's width. The casing 25 is formed by integrally molding part of the casing 19. The casing 25 is formed by molding in a generally cylindrical shape having a circular cross-section, as shown in FIG. 1. In both end portions, across the vehicle's width of the air passage 24, there are formed a first (right-hand) opening 26 and a second (left-hand) opening 27, both circular in shape.

As shown in FIGS. 2 and 3, an outside air inlet 28 for the intake of outside air is formed above a central part of the casings 19 and 25. The outside air inlet 28, generally, is also positioned nearly centrally with respect to the vehicle's width. One of the first and second openings 26, 27 in the casing 25 constitutes an inside air inlet and the other constitutes an inside/outside air outlet which is connected to an upstream end of the connection duct 15.

More specifically, as shown by a solid line portion in FIG. 5 and the right-hand drive vehicle shown in FIG. 2, the first opening 26 is directly opened to the interior of the vehicle compartment and is allowed to serve as an inside air inlet and the upstream end of the connection duct 15 is connected to the second opening 27 serving as an inside/outside air outlet. A downstream end of the connection duct 15 is connected to a suction port 23 formed in the left-hand side of the fan casing 22.

As shown by a broken line portion in FIG. 5 and the left-hand drive vehicle shown in FIG. 3, the second opening 27 is directly opened to the interior of the vehicle compartment and is allowed to serve as an inside air inlet and the upstream side of the connection duct 15 is connected to the first opening 26 serving as an inside/outside air outlet. The downstream end of the connection duct 15 is connected to the suction port 23 formed in the right-hand side of the scroll casing 22.

Figure 6:
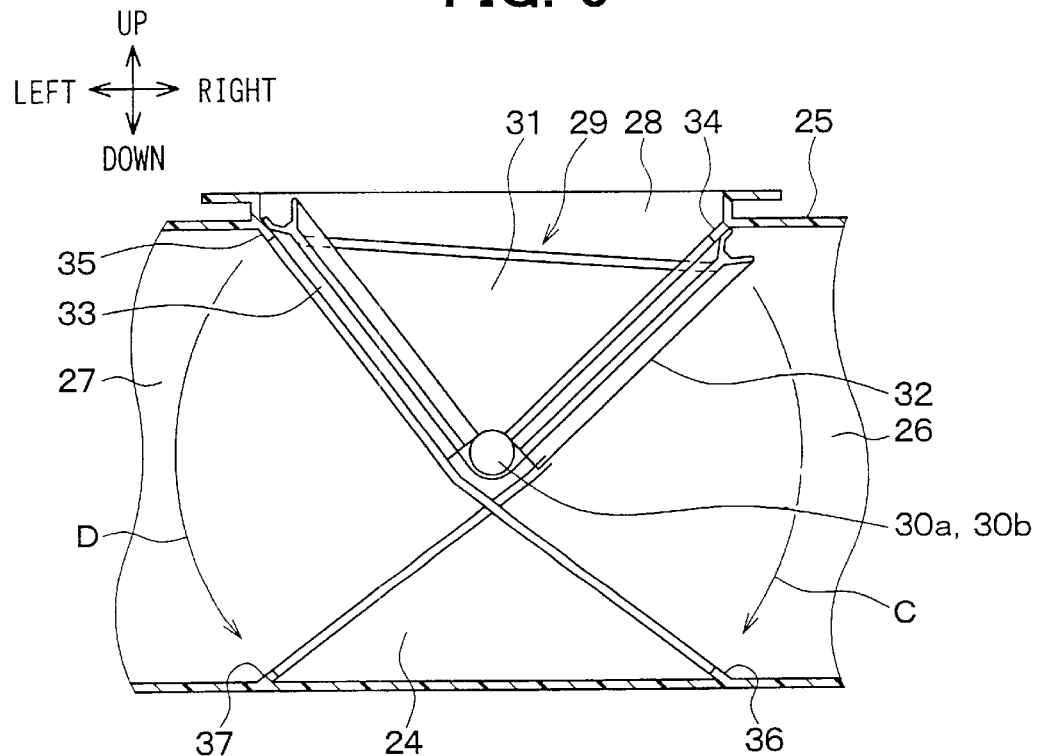
FIG. 6 is a cross-sectional view showing an elastic seal member taken on line VI—VI in FIG. 1.
Figure 7A:
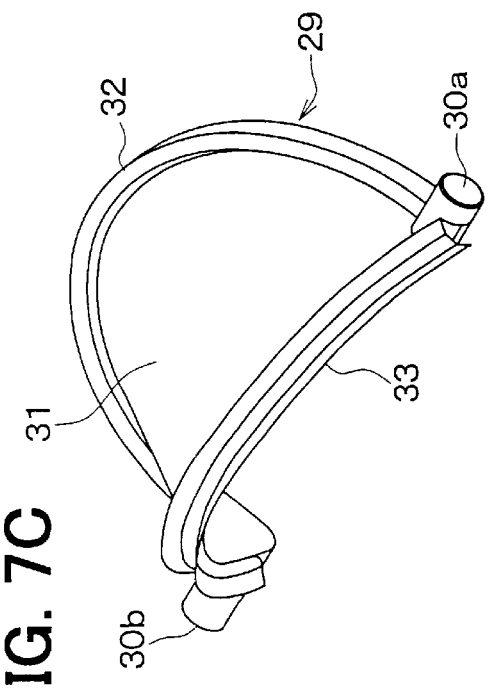
FIG. 7A is a plan view of an air inlet mode selector door used in the first embodiment.
Figure 7C:
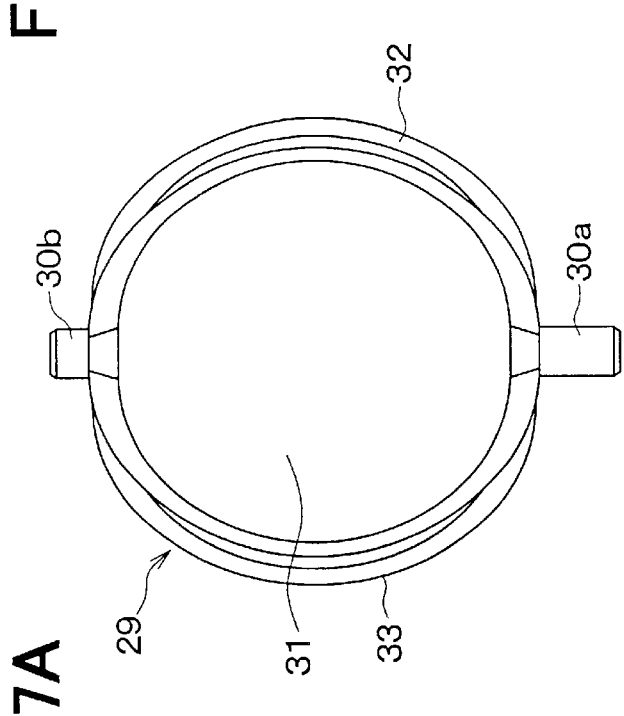
FIG. 7C is a perspective view of an air inlet mode selector door used in the first embodiment.
Figure 7B:
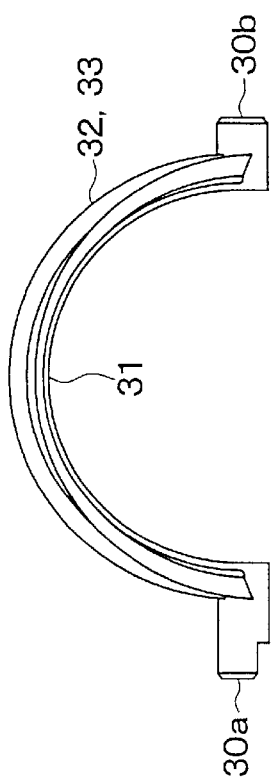
FIG. 7B is a front view of an air inlet mode selector door used in the first embodiment.
Figure 7D:
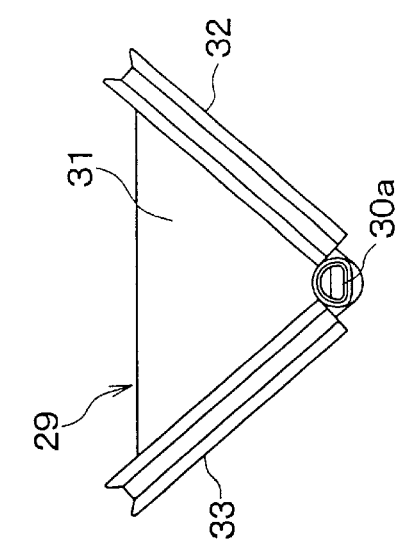
FIG. 7D is a side view of an air inlet mode selector door used in the first embodiment.

On the other hand, an air inlet mode selector door 29 is disposed nearly centrally with respect to the vehicle's width and within the air passage 24 (on a lower side of the outside air inlet 28). The air inlet mode selector door 29 is permitted to rotate on shafts 30a and 30b. FIG. 6 is a cross-sectional view taken along line VI—VI in FIG. 1. FIG. 7 illustrates a form of the air inlet mode selector door 29 alone. As shown in FIGS. 1 and 7D, a door body 31 of the air inlet mode selector door 29 is saddle-shaped and has a circumferential surface formed in a semi-circular shape in the longitudinal direction of the vehicle and has triangular side portions (see FIGS. 6 and 7B) having a base on an upper side as seen from the front and rear sides of the vehicle.

The rotating shafts 30a and 30b are disposed respectively at both end portions of the door body 31, the shafts being parallel with the vehicle's length dimension. The door body 31 and the rotating shafts 30a, 30b are formed integrally by molding resin. Elastic seal members 32 and 33 are fixed respectively to both right and left edge portions of the door body 31 with respect to the vehicle's width. The elastic seal members 32 and 33 are made from a highly elastic and rubbery elastomer and are formed with a lip to ensure sealing. The elastic seal members 32 and 33 generally resemble a V-shape with regard to cross-section.

The air inlet mode selector door 29 shown in FIG. 6 is shown as a door for a right-hand drive vehicle (FIG. 2), in which V-shaped left-hand tips of the elastic seal members 32 and 33 are fixed to both edge portions of the door body 31. The elastic seal members 32 and 33 are in pressure contact with sealing surfaces 34 and 35 of the outside air inlet 28 to fully close the outside air inlet. This allows the portion between the first and second openings 26, 27 of the air passage 24 in the casing 25 to be open. Thus, the blower is in an inside air intake mode.

Then, by rotating the air inlet mode selector door 29 in the direction of arrow C about the rotating shafts 30a and 30b from the state shown in FIG. 6, a V-shaped right-hand tip of the elastic seal member 33 comes into pressure contact with the sealing surface 34 of the outside air inlet 28, while a V-shaped right-hand tip of the elastic seal member 32 comes into pressure contact with a sealing surface 36 of the inner wall of the air passage 24 to close the first opening serving as an inside air inlet and fully open the outside air inlet 28. Thus, an outside air intake mode can be set.

In the case of a left-hand drive vehicle (FIG. 3) there is used, as the air inlet mode selector door 29, a door of the type in which the V-shaped right-hand tip of the elastic seal member 32 comes into pressure contact with the sealing surface 34 of the outside air inlet 28 and the V-shaped right-hand tip of the elastic seal member 33 comes into pressure contact with the sealing surface 35 of the outside air inlet 28 to fully close the outside air inlet 28. With the outside air inlet 28 fully closed, the portion between the first and second openings 26, 27 in the air passage 24 are opened, so that the blower assumes the inside air intake mode.

Then, by rotating the air inlet mode selector door 29 in the direction of arrow D about the rotating shafts 30a and 30b, the V-shaped left-hand tip of the elastic seal member 32 is put in pressure contact with the sealing surface 35 of the outside air inlet 28. This rotation also places the V-shaped left-hand tip of the elastic seal member 33 in pressure contact with a sealing surface 37 of the inner wall of the air passage 24. The conclusion of this rotation closes the second opening 27 serving as an inside air inlet and fully opens the outside air inlet 28. Thus, the outside air intake mode can be set.

The air inlet mode selector door 29 is not limited to the shape shown in FIGS. 6 and 7, but may be an ordinary flat or other plate door, or the like.

Reference will be made below to the heat exchanger section 13 which is disposed within the casing 19 in the interior unit 10 (see FIG. 1). The heat exchanger section 13 is disposed on the vehicular front side of the blower section 12. An inlet passage 40 extending from an outlet side of the scroll casing 22 in the blower section 12 toward the vehicular front side is formed in the bottom portion of the casing 19. Within the casing 19, an evaporator 41 which serves as a heat exchanger for cooling is disposed above the inlet passage 40. The evaporator 41, which is in a generally rectangular thin shape, is disposed in a substantially horizontal direction at a predetermined height from the bottom portion of the casing 19.

The "substantially horizontal" means a downward inclination toward the downstream side of air flow (the vehicular front side) by only a very small angle from the horizon, not a strictly horizontal position. This permits gathering of condensate produced in the evaporator 41 to the lower end portion on the downstream air side along the flow of air and for smooth draining thereof downward to the inclined lower end portion. The evaporator 41 is a low pressure side heat exchanger in a vapor refrigerator, in which a refrigerant absorbs heat and evaporates moisture from air to be blown into the vehicle compartment, thereby cooling the vehicle compartment.

The bottom portion of the casing 19, which is positioned below the evaporator 41, constitutes a condensate receiving portion, with a condensate drain port (not shown) being open in the lowest position within the bottom portion.

The evaporator 41 is constructed such that a heat exchanger portion 41c is disposed between tank portions 41a and 41b. The heat exchanger portion 41c is constructed such that flat tubes (not shown) and corrugated heat transfer fins (not shown) are laminated and bonded in a large number alternately in parallel. The air present in the inlet passage 40 passes from below to above like arrow E through the heat exchanger portion of the evaporator 41.

Within the casing 19, a heater core 42 is disposed in approximately a vertical direction at approximately a right angle on the downstream side of air flow in the evaporator 41, (i.e., on the upper side of the evaporator 41). The heater core 42 is a heat exchanger for heating which heats air with hot water provided from a vehicular engine (not shown).

The heater core 42 is constructed such that a heat exchanger portion 42c is disposed between a hot water inlet tank portion 42a and a hot water outlet tank portion 42b. The tank portions 42a and 42b are spaced a predetermined distance from each other in an opposed relationship. The heat exchanger portion 42c is constructed such that plural flat tubes (not shown) and plural corrugated heat transfer fins (not shown) are stacked and bonded alternately in parallel.

The heater core 42 is an all pass type (one-way flow type) heater core having a construction such that hot water from the hot water inlet tank portion 42a is allowed to pass through all plural flat tubes and flow in one direction from below to above toward the hot water outlet tank portion 42b.

As noted above, the heater core 42 is disposed vertically at approximately right angles relative to the evaporator 41 which is disposed in a substantially horizontal direction. In this case, a lower end portion (located on the hot water inlet tank portion 42a side in this embodiment) is in proximity to one end portion (located on the tank portion 41a side which lies at a vehicular rear position in this embodiment) in the horizontal direction of the evaporator 41. In the illustrated example, a predetermined spacing 43 is formed between the tank portion 41a located at one end of the evaporator 41 and the hot water inlet tank portion 42a located at the lower end of the heater core 42 to effect heat insulation between both tank portions.

Thus, since the lower end portion of the heater core 42 is in proximity to one end portion of the evaporator 41 which is located on the vehicular rear side in the horizontal direction and the heater core 42 is disposed vertically above the evaporator 41, a space 44 can be formed on the vehicular front side with respect to the heater core 42. The space 44 extends vertically in parallel with the surface of the heat exchanger portion 42c of the heater core 42. Above the space 44 is formed a cold air bypass passage 45 for allowing cold air to flow in the direction of arrow F while bypassing the heater core 42.

A rotating shaft 46a of an air mix door 46 is disposed near an upper end of the heater core 42 and on the vehicular front side with respect to the heater core. The rotating shaft 46a is disposed so as to extend in a direction perpendicular to the vehicle's width (i.e. with respect to the paper surface of FIG. 1). The rotating shaft 46a is rotably held at both of its ends by bearing holes (not shown) formed in the wall surface of the casing 19. An upper end portion of the air mix door 46, which is in the form of a plate, is integrally connected to the rotating shaft 46a. Within the space 43 and centered on the rotating shaft 46a, the air mix door 46 is rotatable between its solid line position and its dashed line position in FIG. 1.

The solid line position of the air mix door 46 corresponds to a maximum cooling position for fully closing the air passage in the heat exchanger portion 42c of the heater core 42, while the dashed line position corresponds to a maximum heating position for fully closing the cold air bypass passage 45. When the air mix door 46 opens the air passage in the heat exchange portion 42c of the heater core 42, the air present in the space 44 passes through the heat exchanger portion 42c of the heater core 42 from the vehicular front side to the vehicular rear side as indicated with arrow G.

The air mix door 46 is a temperature regulator means which adjusts the air volume ratio between hot air (arrow G) passing through the heat exchanger portion 42c of the heater core 42 and cold air (arrow F) passing through the cold air bypass passage 45 while bypassing the heater core 42 to adjust the temperature of air to be blown into the vehicle compartment.

Within the casing 19, an air mixing portion 47 is formed on the vehicular rear side (above the blower section 12) with respect to the heater core 42 and the cold air bypass passage 45 to mix the above hot air (arrow G) and cold air (arrow F). By this hot-cold air mixing there is obtained a desired temperature of air.

The blow-mode selector section 14 is disposed on a downstream side of the air mixing portion 47, (i.e., obliquely behind and above the air mixing portion 47). In the blow-mode selector section 14 used in this embodiment, a semi-cylindrical opening sealing surface 48 extending with respect to the vehicle's width is formed in the casing 19. With respect to the opening sealing surface 48, a foot opening 49 is formed in a vehicular rear-side surface portion and a face opening 50 is formed in an upper position with respect to the foot opening 49. Further, a defroster opening 51 is formed on the vehicular front side with respect to the face opening 50.

Inside the semi-cylindrical opening sealing surface 48 is disposed a blow-mode selector door 52 rotatably through a rotating shaft 53. The blow-mode selector door 52 is of the type generally called a rotary door, which is provided with a door body 52a and a door opening 52b, the door body 52a having a circumferential wall surface of a predetermined curvature centered on the rotating shaft 53. The openings 49 to 51 are opened and closed by rotation of the door body 52a.

The foot opening 49 is in communication with a foot diffuser 54a through a foot blow-passage 54. The foot diffuser 54a is open to both right and left sides with respect to the vehicle's width, from which air is blown toward the feet of vehicle occupants (normally, front seat occupants). The face opening 50 is for blowing air toward the faces of occupants through a face duct (not shown). The defroster opening 51 is for blowing air toward the inner surface of the vehicular front window glass through a defroster duct (not shown).

The rotating shaft 53 of the blow-mode selector door 52 is connected to a blow-mode operating mechanism through a link mechanism (not shown), and the door 52 is rotated by the blow-mode operating mechanism. Likewise, the rotating shaft 46a of the air mix door 46 is connected to a temperature control operating mechanism through a link mechanism, and the degree of opening of the air mix door 46 is adjusted by the temperature control operating mechanism. Further, one of the rotating shafts 30a and 30b of the air inlet mode selector door 29 is connected to an air inlet mode selection operating mechanism through a link mechanism, and the rotation of the air inlet mode selector door 29 is rotated by the air inlet mode selection operating mechanism.

It is optional whether the blow-mode operating mechanism, temperature control operating mechanism and air inlet mode selection operating mechanism are to employ an automatic operating mechanism using a servo motor or a manual operating mechanism using manual operation force of an occupant.

Next, the operation of this embodiment will be described based on the above construction. When the fan 20 is operated by the motor 21, inside or outside air is drawn from the air inlet mode selector section 11 and introduced into the suction port 23 of the scroll casing 22 through the connection duct 15. Thus, the air introduced is fed through the interior of the scroll casing 22 from the vehicular rear side to the vehicular front side by means of the fan 20, as indicated with arrow B (see FIG. 1). Therefore, the fed air is introduced into the inlet passage 40 located below the evaporator 41, then passes from below the evaporator 41, through the evaporator 41, to above like the evaporator 41, as indicated by arrow E and is thereby cooled into cold air.

This cold air is then divided, in accordance with the degree of opening of the air mix door 46, into cold air F passing through the cold air bypass passage 45 and hot air G passing through the heater core 42. Therefore, by adjusting the air volume ratio between cold air B and hot air F with use of the air mix door 46, both cold air B and hot air F are mixed together in the vicinity of the air mixing portion 47 and there is obtained a desired temperature of air.

Further, by operating the blow-mode selector door 52 to select either opening or closing of the foot opening 49, face opening 50 and defroster opening 51, air can be blown into the vehicle compartment from one or more predetermined openings.

Figure 8A:
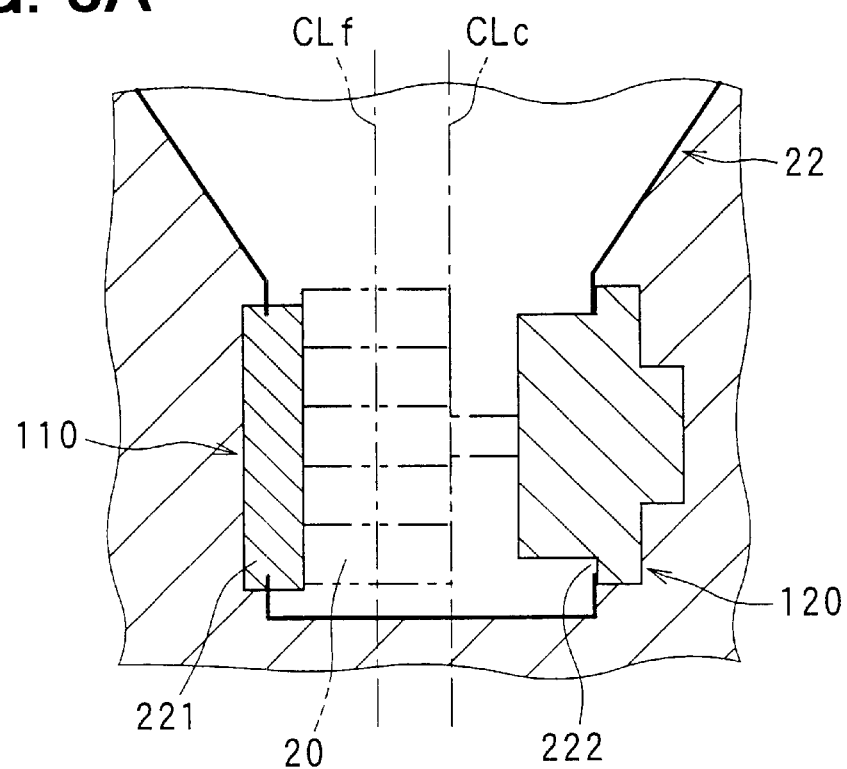
FIG. 8A is a cross-sectional view for explaining effects obtained by the blower of the first embodiment.
Figure 8B:
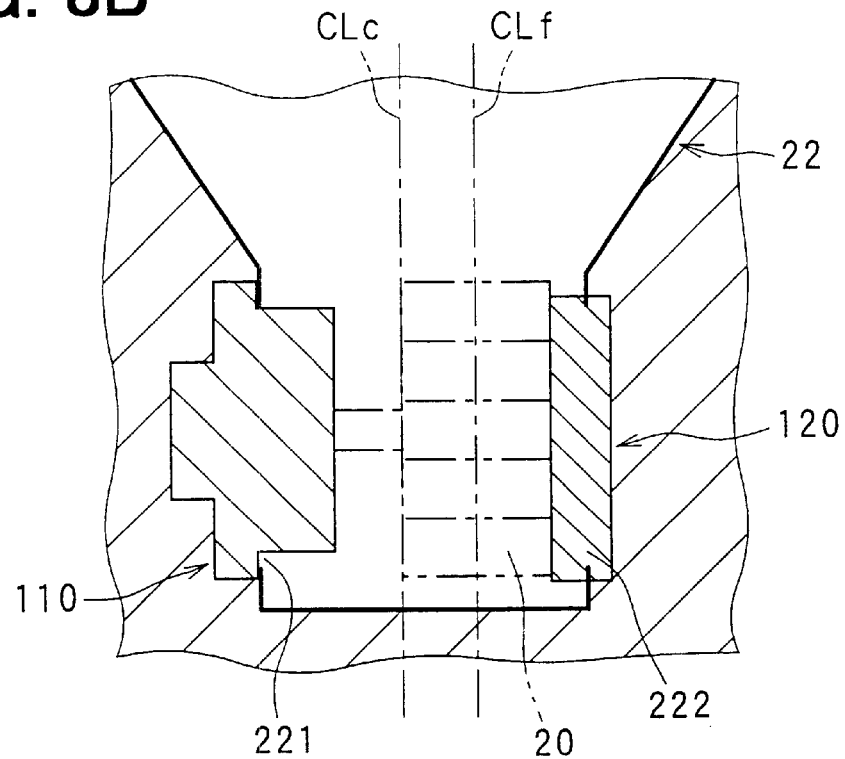
FIG. 8B is a cross-sectional view for explaining effects obtained by the blower of the first embodiment.

Next, a method of manufacturing the fan casing 22 will be outlined. A mold for molding the fan casing 22 with resin, into which molten material is charged, is constructed as in FIGS. 8A and 8B. In FIGS. 8A and 8B, a first impression core 110 for forming a first opening in a position corresponding to one end along the rotational axis CL of the fan 20 and a second impression core 120 for forming a second opening 222 in a position corresponding to the opposite end along the rotational axis CL are attached to a mold body in a removable manner and molten resin is charged into the mold body with both impression cores 110 and 120 attached thereto.

Now, a description will be given about features (functions and effects) of this embodiment. Since the size W of the portion of the fan casing 22 parallel to the rotational axis CL is approximately constant from the start-of-winding position to the end-of-winding position, the shape of the fan casing 22 on the suction port 23 side and that on the motor 21 side can be prevented from becoming greatly different from each other. That is, the shape can be symmetrical or nearly symmetrical about the interface 16.

Thus, as referred to above in connection with the manufacturing method for the fan casing 22, the fan casing 22 for a right-hand drive vehicle and the fan casing 22 for a left-hand drive vehicle can be manufactured easily by merely replacing the impression cores 110 and 120. Consequently, the fan casing 22 can be used in common for both blowers (fan casings) to be disposed on the left- and right-hand sides, respectively, of the vehicle.

Further, the fan datum line CLf passes through a nearly central part of the fan 20 which is parallel to the rotational axis CL and is offset to the suction port 23 side (left-hand side in FIG. 4) with respect to the casing datum line CLc which passes through a nearly central part of the portion of the fan casing 22. Since the flange portion 21d of the motor holder 21a lies at a position offset to one side (suction port 23 side) along the rotational axis direction CL with respect to the right-hand side of FIG. 4), there is formed a space α that is offset or projected to the right side of FIG. 4, or rather, to the side opposite the suction port 23 with respect to the flange 21d. Therefore, even if the dimension W of the portion parallel to the rotational axis direction CL of the fan casing 22 is made substantially constant from the start-of-winding position to the end-of-winding position of the fan casing, it is possible to ensure a sufficient cross-sectional area of passage.

In this embodiment, as described above, it is not necessary to make the diameter of the fan casing large (that is, to the extent that the air passage 22a is enlarged according to a logarithmic spiral) in order to ensure a sufficient cross-sectional area of passage. Therefore, even while maintaining a small size of the fan casing, it is possible to use the fan casing for both blowers (fan casings), that is, in the left- and right-hand sides, respectively, of the vehicle.

Figure 9:
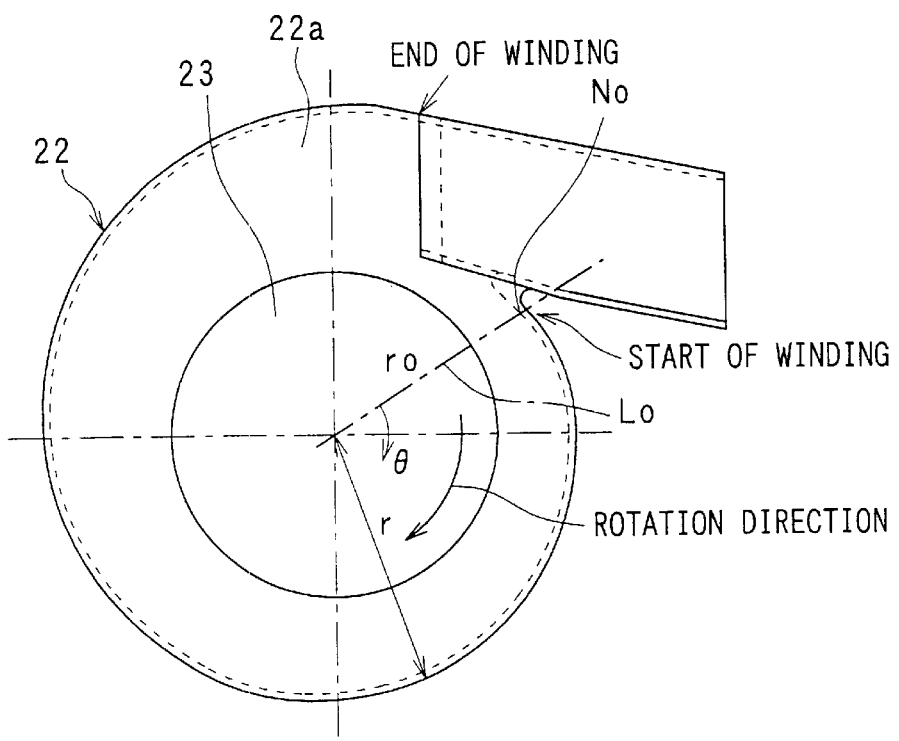
FIG. 9 is a front view of the blower of the first embodiment.

In this embodiment, the extent angle is set at 4.5°. The extent angle is n in $r = r_0 \cdot e^{(n \cdot \theta)}$ (logarithmic spiral equation), and ro stands for, as shown in FIG. 9, the distance from the center of the fan 20 (fan casing 22) to the inner wall surface 22b of the outer wall of the fan casing 22 along a line Lo joining the center of the fan 20 (fan casing 22) and the nose portion No. Winding angle θ is that angle as measured in the direction of rotation of the fan 20.

Figure 10A:
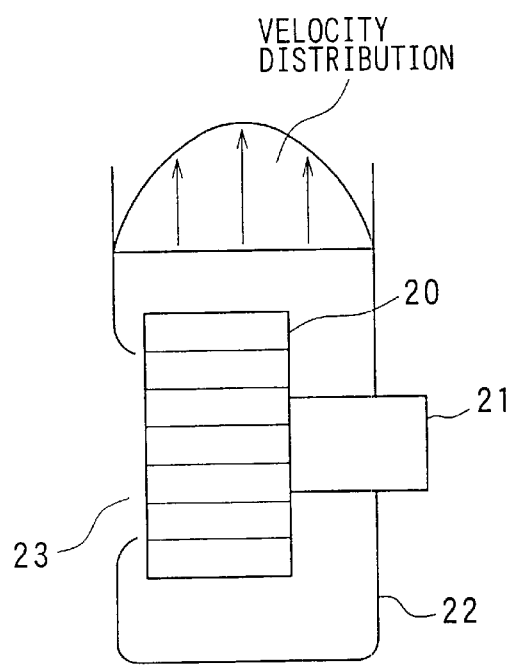
FIG. 10A is an explanatory diagram for explaining effects obtained by the blower of the first embodiment.
Figure 10B:
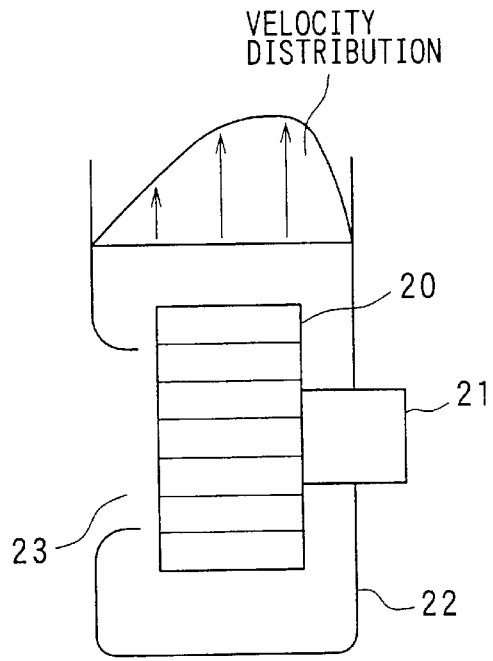
FIG. 10B is an explanatory diagram for explaining effects obtained by the blower of the first embodiment.

The nose portion No stands for an overlapped portion of both start-of-winding and end-of-winding of the fan casing 22. In the nose portion No, both upstream and downstream sides of air flow are in communication with each other through a slight gap. Further, because the fan datum line CLf, which passes through an approximately middle part of the fan 20 along the rotational axis direction CL, is offset to the suction port 23 side (left-hand side in FIG. 4) with respect to the casing datum line CLc which passes through an approximately central part of a portion parallel to the rotational axis direction CL in the fan casing 22, there is obtained a substantially normal distribution as shown in FIG. 10A in which the velocity of air flowing through the fan casing 22 becomes maximum on the fan datum line CLf. FIG. 10B shows an air velocity distribution obtained when the fan datum line CLf and the casing datum line CLc are aligned with each other.

Figure 11:
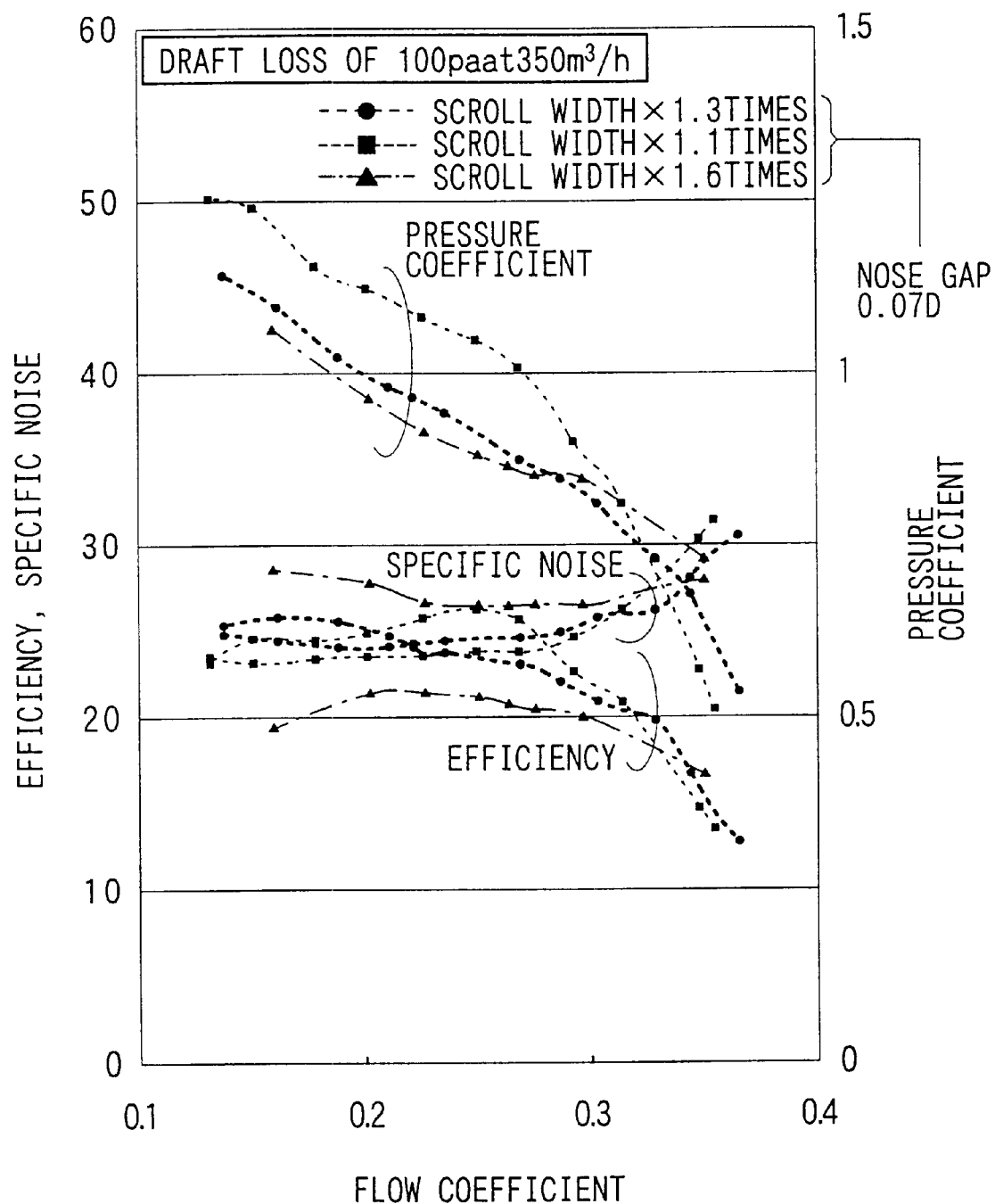
FIG. 11 is a graph showing relationships between blast characteristics of a fan blower section including various fan scroll widths.

FIG. 11 is a diagram showing test results of blast characteristics of the blower section 12 with the ratio between the size ("scroll width W" hereinafter) of the portion of the fan casing 22 parallel to the rotational axis CL and the size ("fan width h" hereinafter) of the portion of the fan 20 parallel to the rotational axis direction as a parameter.

Figure 12:
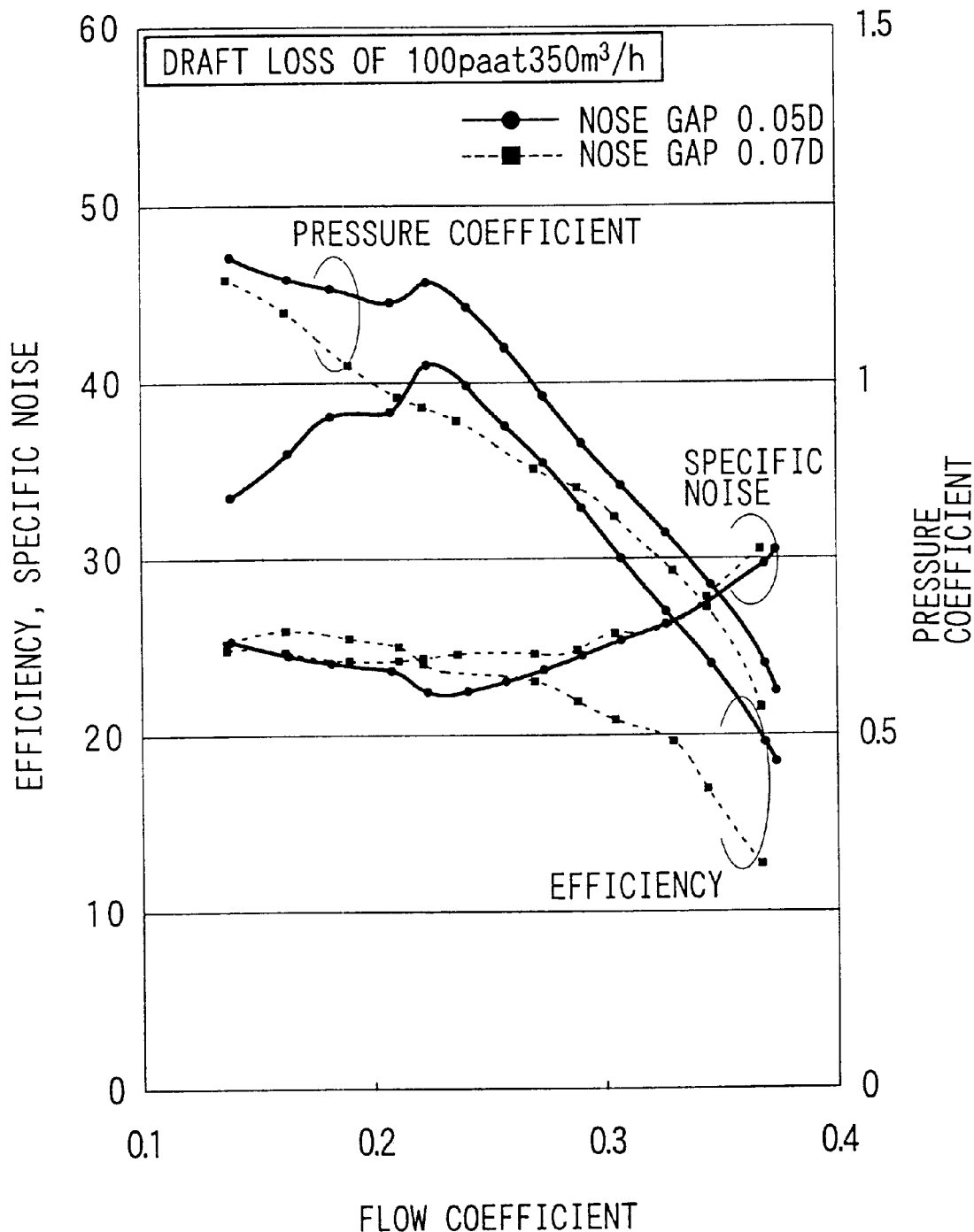
FIG. 12 is a graph showing relationships between blast characteristics of a fan blower section including various nose gaps.

FIG. 12 is a diagram of test results showing a relation between the nose gap (distance between the fan 20 and the nose portion No) NG and blast characteristics of the blower section 12. As is apparent from these test results, it is preferable that the scroll width W be set larger than 1.1 times and smaller than 1.6 times the fan width h. It is more preferable that the scroll width W be set larger than 1.1 times and smaller than 1.6 times the fan width and that in this state the nose gap NG be set smaller than 0.07 times the diameter D of the fan 20. In this embodiment, the scroll width W is 1.3 times the fan width and the nose gap NG is 0.05 times the fan diameter.

The above test results are of measurements conducted in accordance with JIS B 8330 and JIS B 8346 while making control so as to generate a pressure loss (draft loss) of 100 Pa at a blast volume of 350 m$^3$. Specific noise, efficiency, flow coefficient, and pressure coefficient are as defined in JIS B 0132.

Second Embodiment

Figure 13:
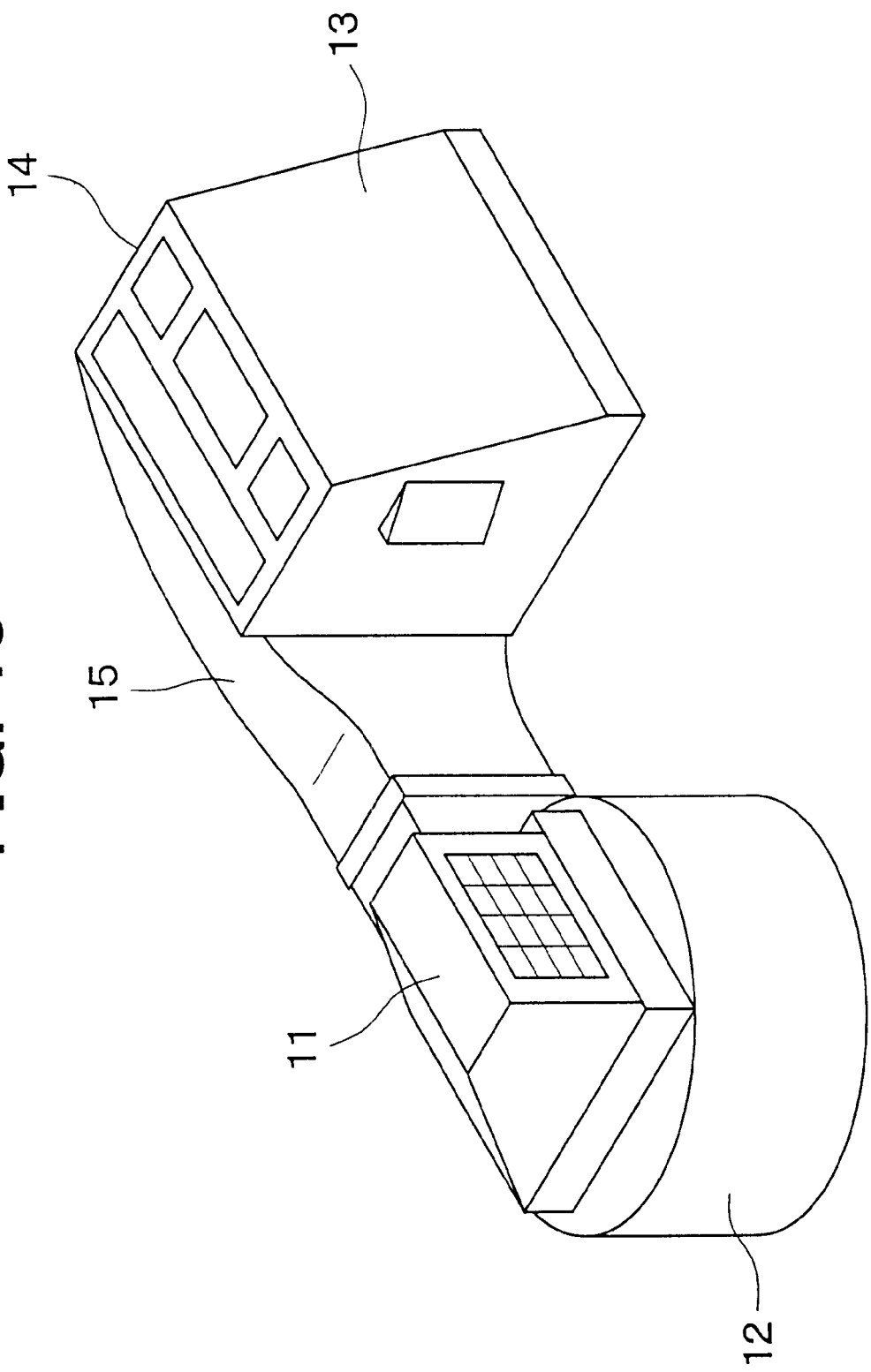
FIG. 13 is a perspective view of an interior unit in a vehicular air conditioner according to a second embodiment of the present invention.

Although the interior unit of the above embodiment is a center-installed unit wherein the air inlet mode selector section 11 and the blower section 12 are disposed nearly centrally with respect to the vehicle's width, this second embodiment is applied to an interior unit 10 wherein an air inlet mode selector section 11, a heat exchanger section 13, and a blow-mode selector section 14, which will all hereinafter be referred to generically as "air conditioning unit," are disposed nearly centrally with respect to the vehicle's width, while a blower section 12 is offset with respect to the vehicle's width (on the right or left side) with respect to the air conditioning unit through a connection duct 15. FIG. 13 is a perspective view of an interior unit in a vehicular air conditioner according to a second embodiment of the present invention.

Figure 14B:
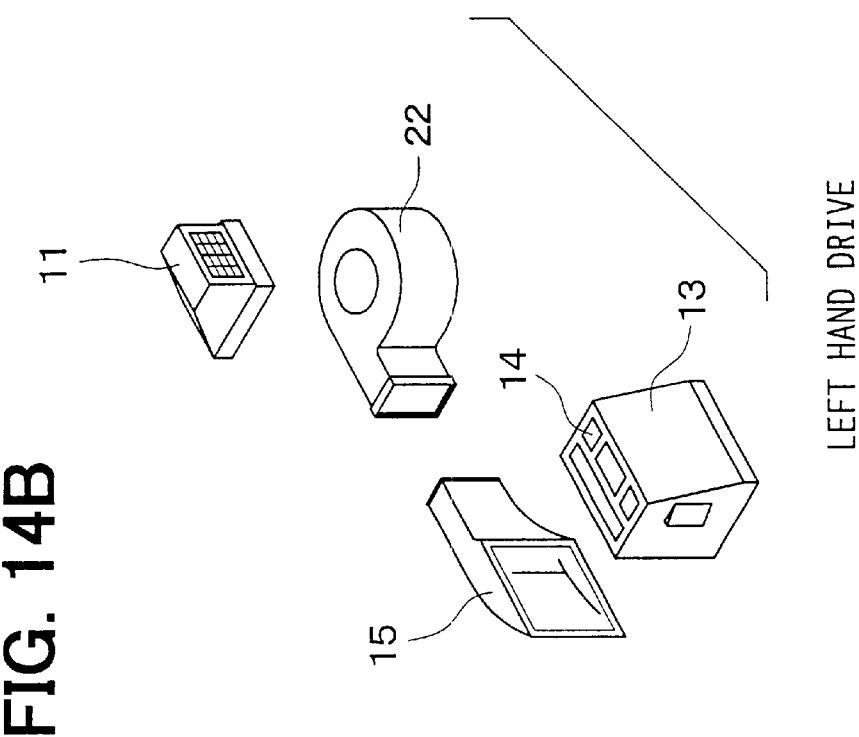
FIG. 14B is an explanatory diagram for explaining effects obtained by the vehicular air conditioner of the second embodiment.
Figure 14A:
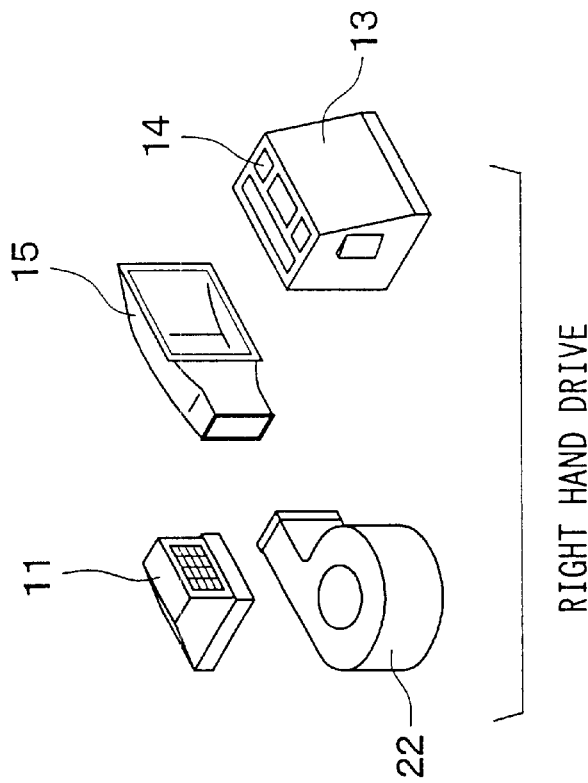
FIG. 14A is an explanatory diagram for explaining effects obtained by the vehicular air conditioner of the second embodiment.

In this second embodiment, as also shown in FIGS. 14A and 14B, common components (the air inlet mode selector section 11, heat exchanger section 13, and blow-mode selector section 14 in this embodiment) used in common to various vehicle models and dedicated components (fan casing 22 and connection duct 15 in this embodiment) for each individual vehicle model, out of components which constitute the interior unit 10 (air conditioner casing), are fabricated as separate components. Either the dedicated components for a left-hand drive vehicle or the dedicated components for a right-hand drive vehicle are selected at the time of assembly, whereby both interior units 10 for right- and left-hand drive vehicles, respectively, can be easily manufactured.

Third Embodiment

Figure 15:
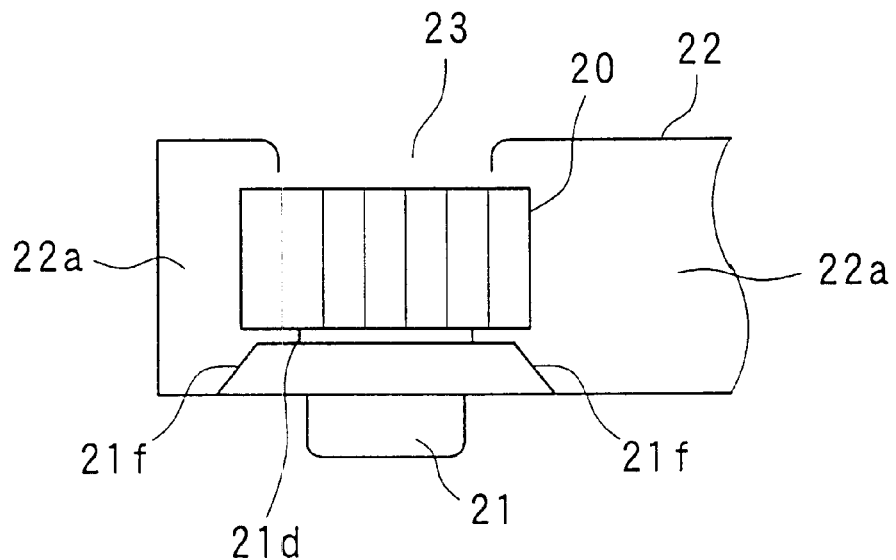
FIG. 15 is a cross-sectional view of a blower according to a third embodiment of the present invention.

In this third embodiment, as shown in FIG. 15, a motor holder 21a (flange portion 21d) is provided with a tapered portion 21f which is divergent toward its outside diameter side with separation from the fan 20. According to this construction, air which is blown from the fan 20 can be conducted smoothly into an air passage 22a.

Fourth Embodiment

Figure 16:
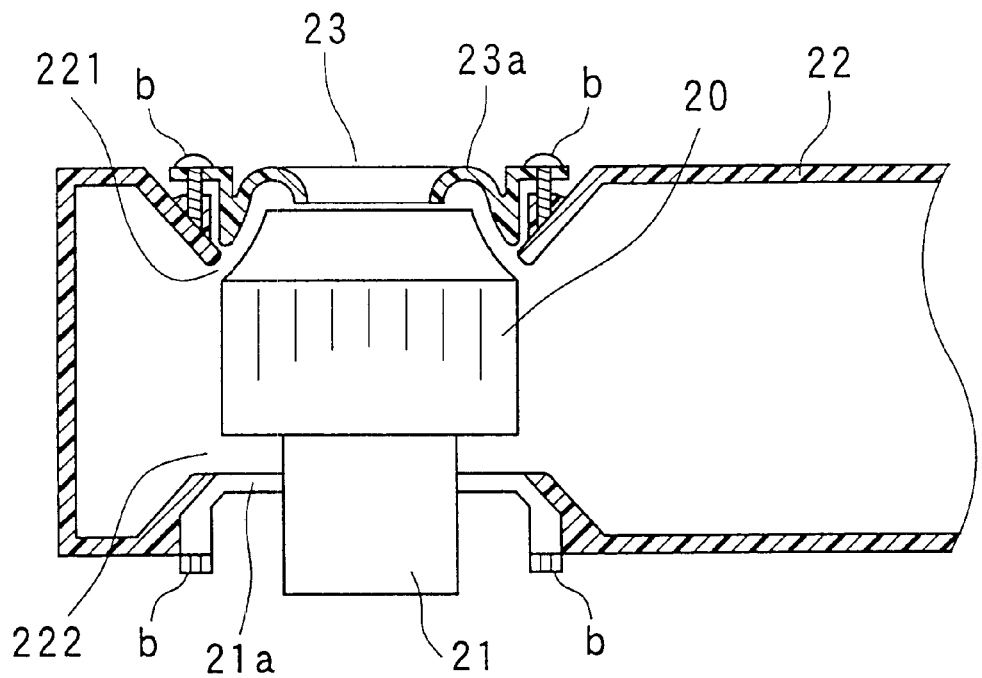
FIG. 16 is a cross-sectional view of a blower according to a fourth embodiment of the present invention.

In this fourth embodiment, as shown in FIG. 16, a first opening 221 provided in a portion of the fan 20 corresponding to one end along the rotational axis direction CL and a second opening 222 provided in a portion of the fan corresponding to an opposite end along the rotational axis direction CL are formed in the same shape. A bell mouth portion 23a formed at an outer edge portion of a suction port 23 is provided as a separate component, then at the time of assembly the bell mouth portion 23a is attached to the fan casing 22. In this embodiment, the motor holder 21a and the bell mouth portion 23a are mounted with clamp means such as bolts b.

According to this construction, unlike the previous embodiments, the openings 221 and 222 are not required to be rendered different in shape from each other with impression cores 110 and 120, so that the fan casing 22 can be used in common for both blowers (fan casings) to be disposed on the left- and right-hand sides, respectively, of the vehicle. This contributes to a reduced cost of the mold used for manufacturing the fan casing.

Further Embodiment

Figure 17A:
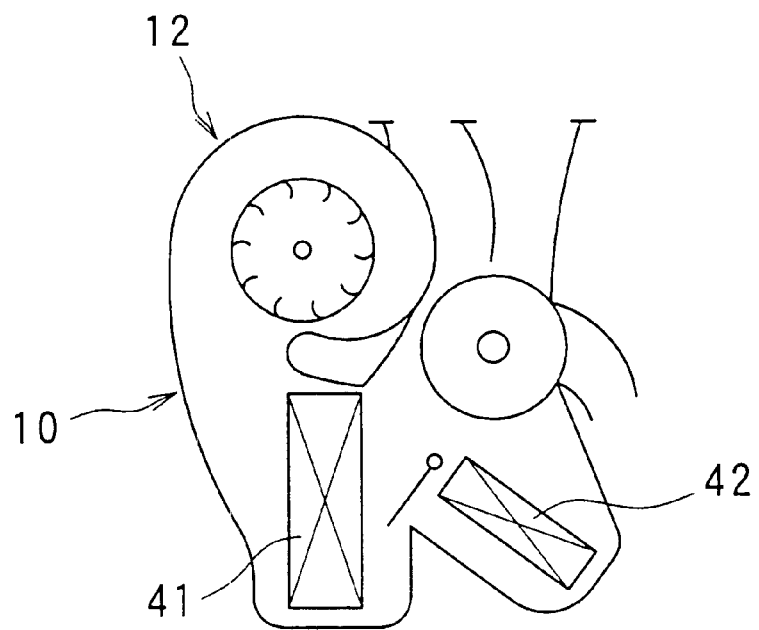
FIG. 17A is a cross-sectional view of an interior unit in a vehicular air conditioner according to a further embodiment of the present invention.
Figure 17B:
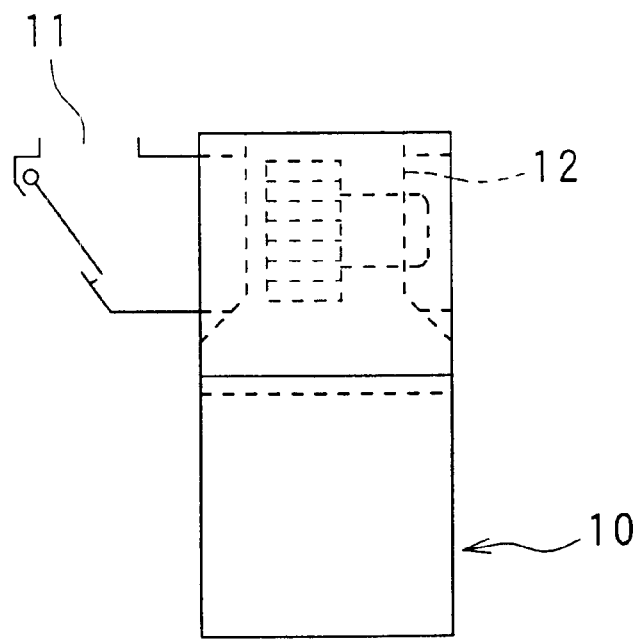
FIG. 17B is a front view of an interior unit in a vehicular air conditioner according to a further embodiment of the present invention.

Although in the interior unit 10 described in each of the above embodiments, the blower section 12 is disposed on a lower side, the present invention is not limited thereto, but is also applicable to, for example, such an interior unit as shown in FIGS. 17A and 17B in which a blower section 12 is disposed on an upper side. FIG. 17 shows an air inlet mode selector section 11 attached to the blower section 12, both located above the interior unit 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A blower for a vehicle, comprising:
   a centrifugal fan which draws air along a fan rotational axis and which blows air radially away from the fan rotational axis;
   a scroll casing which houses the centrifugal fan, the scroll casing defining a passage for the air to be blown from the centrifugal fan; and
   a drive means for rotating the centrifugal fan,
   wherein the size of a portion of the scroll casing parallel to the rotational axis is nearly constant from a start-of-winding position to an end-of-winding position in the scroll casing,
   a suction port is formed in a portion of the scroll casing corresponding to a first end of the rotational axis, while in a portion of the scroll casing corresponding to a second end of the rotational axis the drive means is fixed to the scroll casing by a mounting member,
   a fan datum line which passes through an approximately middle part of the centrifugal fan in the rotational axis direction is offset to the suction port side with respect to a casing datum line which passes through an approximately middle part of the portion of the scroll casing parallel to the rotational axis, and
   a flange portion of the mounting member, the flange portion facing the centrifugal fan and lying in a position offset to the first end of the scroll casing along the rotational axis rather than the second end of the rotational axis.

2. A blower for a vehicle according to claim 1, wherein the size of the portion of the scroll casing parallel to the rotational axis is larger than 1.1 times and smaller than 1.6 times the size of the portion of the centrifugal fan parallel to the rotational axis.

3. A blower for a vehicle according to claim 1, wherein a distance between a nose portion of the scroll casing and the centrifugal fan is smaller than 0.07 times the diameter of the centrifugal fan.

4. A blower for a vehicle according to claim 2, wherein a distance between a nose portion of the scroll casing and the centrifugal fan is smaller than 0.07 times the diameter of the centrifugal fan.

5. An air conditioner for a vehicle for conditioning air to be blown into a passenger compartment of the vehicle, comprising:
   an air conditioner casing within which flows air to be blown into the vehicle compartment; and
   a blower for making air flow within the air conditioner casing,
   the blower further comprising:
      a centrifugal fan which draws in air in a rotational axis direction and which blows air radially outwards;
      a scroll casing which houses the centrifugal fan and which defines a passage for the air to be blown from the centrifugal fan; and
      a drive means for rotating the centrifugal fan,
   wherein a size of a portion of the scroll casing parallel to a rotational axis is nearly constant from a start-of-winding position to an end-of-winding position in the scroll casing, a suction port is defined in a portion of the scroll casing corresponding to a first end of the rotational axis, while in a portion of the scroll casing corresponding to a second end of the rotational axis the drive means is fixed to the scroll casing through a mounting member, a fan datum line which passes through an approximately middle part of the centrifugal fan along the rotational axis is offset to the suction port side with respect to a casing datum line which passes through an approximately middle part of a portion of the scroll casing parallel to the rotational axis, a flange portion of the mounting member, the flange portion facing the centrifugal fan and lying in a position offset to the first end of the scroll casing along the rotational axis rather than the second end along the same rotational axis, and the air conditioner casing comprises common components for use in common to various vehicle models and dedicated components for specific vehicle models, the common and dedicated components being fabricated as separate components and thereafter assembled together.

6. A blower for a vehicle, comprising:

a centrifugal fan which draws air along a rotational axis and which blows air radially outwards from the rotational axis;

a scroll casing which houses the centrifugal fan and which constitutes a passage for the air to travel from the centrifugal fan; and a drive means for rotating the centrifugal fan, wherein the size of a portion of the scroll casing parallel to a rotational axis is nearly constant from a start-of-winding position to an end-of-winding position in the scroll casing, first and second openings, being the same in shape, are formed respectively in a portion of the scroll casing corresponding to a first end of the centrifugal fan along the rotational axis and in a portion of the scroll casing corresponding to a second end of the centrifugal fan along the rotational axis, a bell mouth portion which constitutes an outer edge portion of a suction port is installed in the first opening and the drive means is installed in the second opening through a mounting member.

7. A blower for a vehicle, comprising:

a centrifugal fan that draws air along a fan rotational axis and which blows air radially away from the fan rotational axis;

a scroll casing which houses the centrifugal fan, the scroll casing defining a suction port and a passage, the suction port being used for drawing air into the centrifugal fan, and the passage for blowing air from the centrifugal fan, wherein a width of a surface of the scroll casing, that is parallel to the fan rotational axis, is constant from a start-of-winding position to an end-of-winding position of the scroll casing;

a drive means fixed to the scroll casing by a mounting member, wherein the suction port formed in a portion of the scroll casing corresponds to a first end of the rotational axis, and the drive means is located at a portion of the scroll casing corresponding to a second end of the rotational axis; and a flange portion, of a mounting member, faces the centrifugal fan and lies in a position offset to the first end of the scroll casing along the rotational axis rather than the second end of the rotational axis.

8. A blower for a vehicle according to claim 7, wherein the size of the surface of the scroll casing parallel to the rotational axis is larger than 1.1 times and smaller than 1.6 times a size of a surface of the centrifugal fan parallel to the rotational axis.

9. A blower for a vehicle according to claim 7, wherein a distance between a nose portion of the scroll casing and the centrifugal fan is smaller than 0.07 times a diameter of the centrifugal fan.

10. A blower for a vehicle according to claim 7, wherein a distance between a nose portion of the scroll casing and the centrifugal fan is smaller than 0.07 times a diameter of the centrifugal fan.

11. A blower for a vehicle according to claim 7, wherein a fan datum line which passes through an approximately middle part of the centrifugal fan along the rotational axis is offset to the suction port side with respect to a casing datum line which passes through an approximately middle part of a portion of the scroll casing parallel to the rotational axis.

12. A blower for a vehicle according to claim 7, further comprising an air conditioning casing having common components for use in common to various vehicle models and dedicated components for specific vehicle models.

13. A method of making a scroll casing which houses a centrifugal fan and which has a first opening and a second opening formed in positions corresponding to a first end and an opposite, second end, respectively, along a rotational axis of the centrifugal fan, wherein a first impression core which forms a portion corresponding to the first opening and a second impression core which forms a portion corresponding to the second opening are removably mounted to a mold body, and charging molten material into the mold body with both impression cores in a mounted state within the mold body.

* * * * *